Jan. 8, 1963   R. O. CASE, JR   3,072,854
ARTIFICIAL REACTANCE ELEMENTS FOR USE WITH MODULATED SIGNALS
Filed May 1, 1959   7 Sheets-Sheet 1

*INVENTOR.*
ROBERT O. CASE JR.
BY
AGENT

INVENTOR.
ROBERT O. CASE JR.

BY

Louis J. Knobbe

AGENT

Jan. 8, 1963     R. O. CASE, JR     3,072,854
ARTIFICIAL REACTANCE ELEMENTS FOR USE WITH MODULATED SIGNALS
Filed May 1, 1959     7 Sheets-Sheet 7

INVENTOR.
ROBERT O. CASE JR.
BY Louis J. Knobbe
AGENT

United States Patent Office 3,072,854
Patented Jan. 8, 1963

3,072,854
ARTIFICIAL REACTANCE ELEMENTS FOR USE
WITH MODULATED SIGNALS
Robert O. Case, Jr., La Habra, Calif., assignor to
North American Aviation, Inc.
Filed May 1, 1959, Ser. No. 810,367
17 Claims. (Cl. 328—155)

This invention relates to artificial reactance components, or reactance components that behave in essentially the same way with respect to the envelope of a carrier modulated input signal as a natural reactance component behaves with respect to a simple input signal. By the term "natural reactance components" is meant an energy storage device, or a two-terminal combination of such devices. Examples of energy storage devices are capacitors, inductance coils, flywheels, springs, accumulators, compressible fluids and structures, and phosphors. Such storage elements are commonly used in electrical, mechanical, hydraulic, pneumatic, acoustical and optical systems.

In electrical analog computers and control circuits, reactive components are used in conjunction with resistors and amplifiers to perform certain operations on analog quantities as a function of frequency or of time. Networks such as lag networks, lead networks, differentiators and integrators and many others are commonly used. As long as the analog information is conveyed as an unmodulated voltage or current, the natural reactance components function satisfactorily. A complication however occurs in the case of a computer or control system in which the analog information is conveyed as the amplitude, or modulating envelope, of an alternating current carrier voltage or current. Such signals for example are provided by the amplitude modulator described in application, Serial No. 707,317, filed January 6, 1938, by the inventor of the present application and assigned to North American Aviation, Inc., assignee of the present invention. With such signals, circuits incorporating the natural reactance elements are unusable since they operate upon the carrier rather than on the modulation envelope.

Several approaches for overcoming this problem are presently known in the art. For example, the modulated signal may be demodulated, applied to the appropriate component or network having natural reactive elements, and then remodulated. The disadvantages of this procedure are that it leads to considerable circuit complexity, the circuits involved usually add drift and offset problems, and performance is usually poor because of the generation of harmonics of the carrier frequency in the process of modulation and demodulation. An attempt to filter these harmonics often introduces undesirable carrier phase shift and other effects.

Another approach known in the art is to utilize an instrument servo which positions potentiometers and tachometers to create the desired frequency response. This type of system has the disadvantage of being bulky and heavy and having rotating parts which have a limited life expectancy, particularly where rapidly changing signals are involved. These are particular handicaps for airborne analog computers in which light weight and reliability are the foremost considerations.

Also known in the art are "notch filters." These elements are often unusable because they require extreme stability of the carrier frequency.

The approach of the prior art which most closely resembles the present invention involves modulating or switching of the electrical connections to or from natural reactive components with a square-wave switching function of the same frequency as the carrier of the signal conveying the analog information. The primary disadvantage of this system is that it provides an output which is a square wave rather than the desired sinusoidal wave form. Attempts to filter the square-wave output result in undesirable carrier phase shift for small changes in carrier frequency.

The present invention employs an adaptation of the time division technique. In accordance with a preferred embodiment, an electrical signal contained in a natural reactance component or components is modulated by a rectangular wave switching function having a recurrence frequency which is very high compared with the carrier frequency of the signal conveying the analog information. The pulse-width of the rectangular switching function is modulated sinusoidally at the reference carrier frequency. This system has all of the advantages of the modulated reactive elements known in the prior art but without the severe disadvantage of a square wave output.

Accordingly, an object of this invention is to provide improved artificial reactance elements for use with modulated signals.

It is also an object of this invention to provide artificial reactive components having a sinusoidal waveform output.

It is another object of this invention to provide improved artificial reactive components operable directly in circuit with carrier modulated signals without any requirement of demodulation and remodulation thereof.

It is still another object of this invention to provide artificial reactance elements having negligible carrier phase shift with small changes of carrier frequency.

A further object of this invention is to provide artificial reactance elements in which the possibility of drift is greatly reduced.

It is still another object of this invention to provide artificial reactance elements having no moving parts.

It is another object of this invention to provide artificial reactance elements characterized by light weight and a physically small package.

Another object of this invention is to provide artificial reactance elements in which wide bandwidth operation is possible.

It is another object of this invention to provide artificial reactance elements which do not require extreme carrier frequency stability.

It is still another object of this invention to provide artificial reactance elements embodying circuitry having long service life with low maintenance requirements.

Other objects of this invention will be apparent from the following description taken in connection with the accompanying drawings in which.

Figure 5:
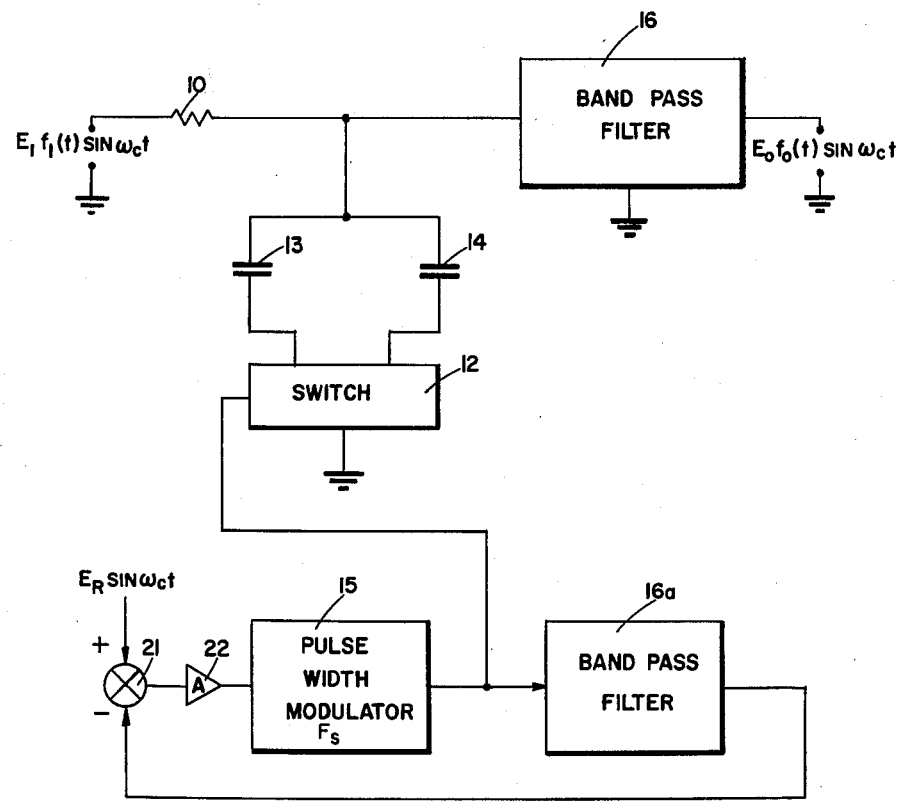
Figure 6:
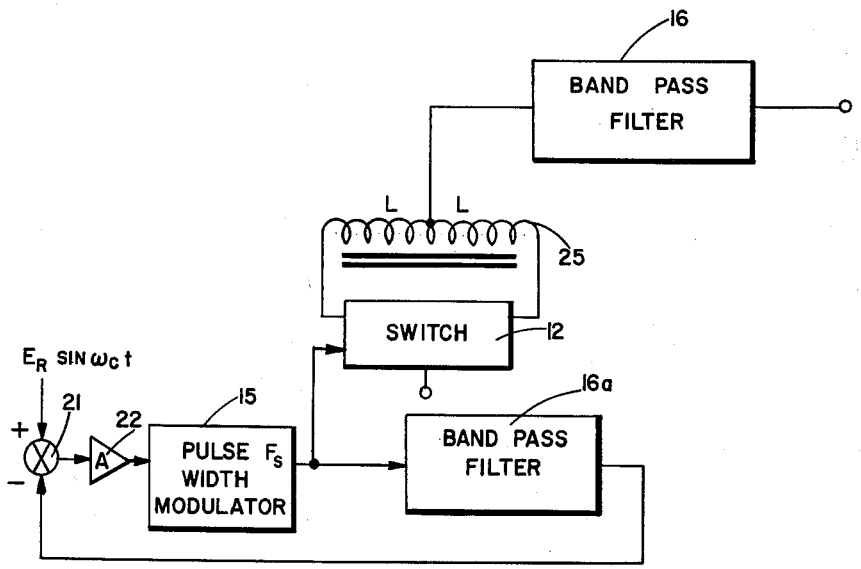
Figure 2:
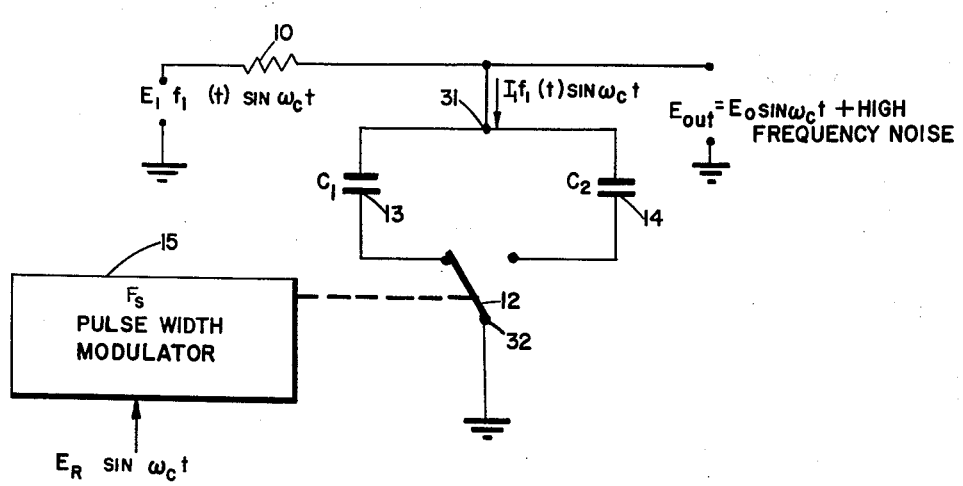
FIG. 2 is a partially schematic, partially block diagram of one embodiment of this invention.
Figure 12:
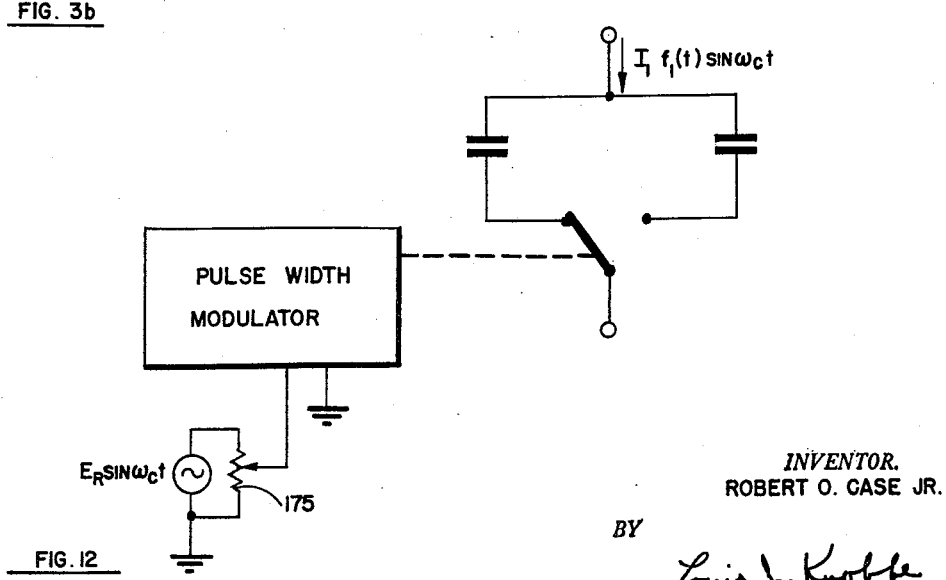
Figure 8:
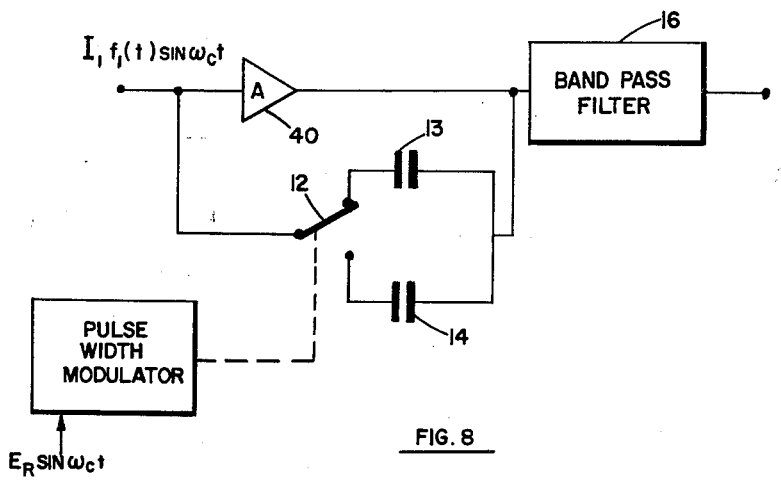
Figure 11:
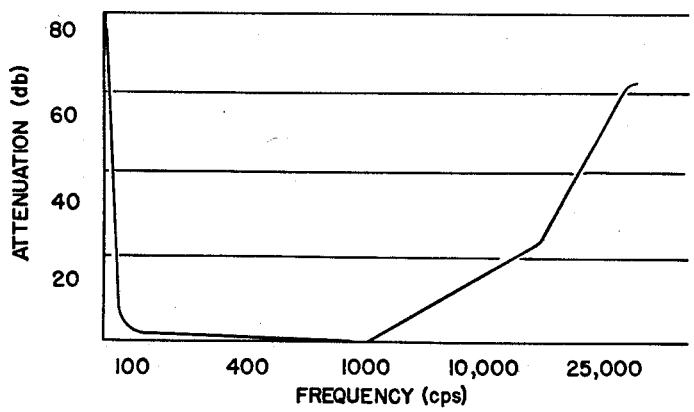
Figure 9:
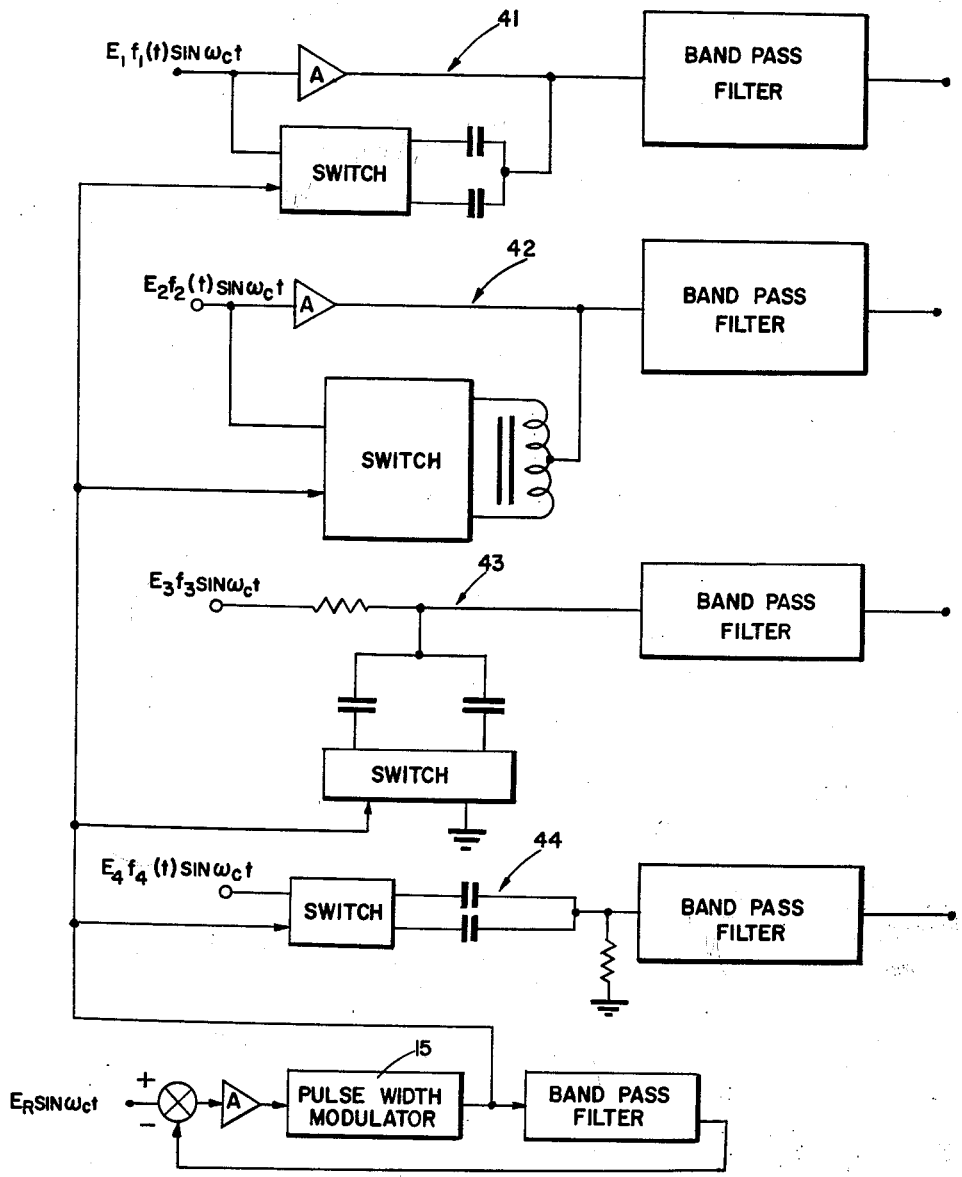
Figure 10:
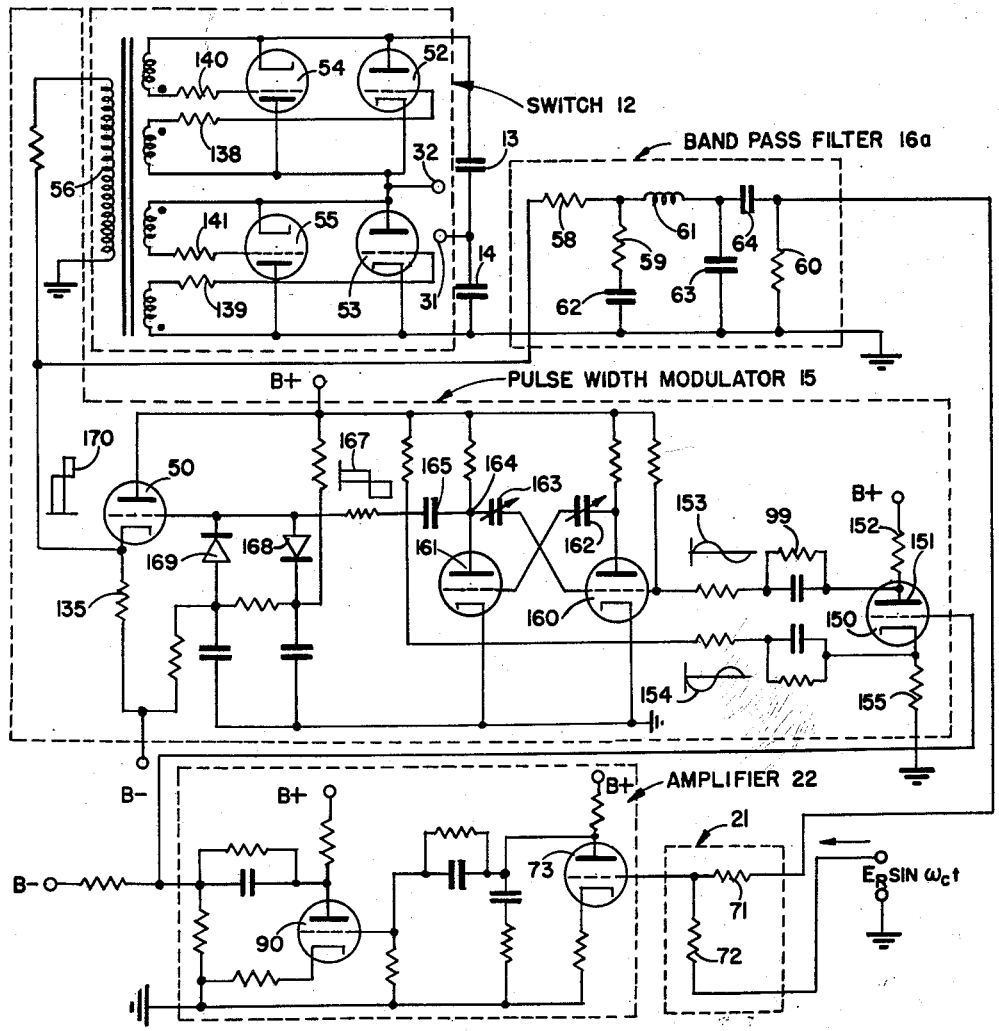

FG. 4 illustrates the addition of a band-pass filter to the circuit of FIG. 2;

FIG. 5 is a diagram of a further embodiment of this invention in which a negative feedback loop is employed;

FIG. 6 illustrates in block diagram form an artificial inductance constructed in accordance with this invention;

FIGS. 7a and 7b illustrate further embodiments of this invention;

FIG. 8 illustrates an integrator circuit constructed in accordance with this invention;

FIG. 9 illustrates a multi-stage analog computer utilizing artificial reactance elements constructed in accordance with this invention;

FIG. 10 is a schematic diagram of circuitry which may be utilized in this inventon;

FIG. 11 is a graph illustrating the attenuation characteristics of a filter utilized in this invention;

And FIG. 12 illustrates an embodiment of this invention in which the artificial reactance is variable.

Figure 1:
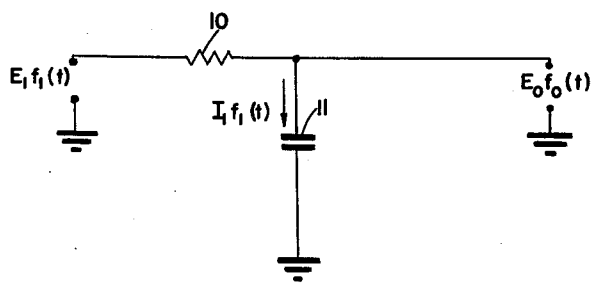
FIG. 1 is a schematic diagram of a representative prior art lag circuit.

A typical circuit used in analog computers is the lag circuit, an example of which is shown in FIG. 1. This circuit comprises resistor 10 in series with the input and output of the circuit and a capacitor 11 connected in parallel between the output and ground. The voltage across the capacitor 11 is determined by the capacitance and the integral of the current through the capacitor with respect to time; or more precisely:

$$e = \frac{1}{c}\int i\,dt \qquad (1)$$

So long as the current input to this circuit is a signal of modulating frequency, that is, of envelope frequency such as $I_1 f_1(t)$ the capacitor 11 operates with respect therewith to provide the desired circuit function. However, if the current input is a modulated current of carrier frequency or sideband frequency, as for example a suppressed carrier modulated signal $I_1 f_1(t) \sin \omega_c t$ it will be apparent from Equation 1 that the capacitor 11 will operate upon the carrier. What is desired is that the capacitor operate upon the modulation envelope, $I_1 f_1(t)$, or modulation envelope only, and not on the carrier frequency or sideband frequencies. Thus the desired characteristics of an artificial capacitance designed to operate upon the modulated signal is defined by the equation:

$$e_{\text{out}} = [K \int I_1 f_1(t) dt] \sin \omega_c t \qquad (2)$$

when modulated currents are used.

A lag circuit incorporating applicant's invention is shown in FIG. 2. For ease of illustration, certain of the elements are shown functionally. The functions shown are preferably performed by electronic circuitry, one embodiment of which is shown hereinafter.

Referring now to FIG. 2, the same resistive element 10 may be incorporated and connected as before between the input and output of the lag circuit. An artificial capacitor constructed according to this invention has output terminals 31 and 32. A fast single-pole double-throw switch 12 interconnects the modulated input signals at the output terminals 31 and 32 with one or the other of reactive circuit paths comprising identical capacitors 13 and 14 in response to the output of a pulse-width modulator 15. The pulse-width modulator 15 may be supplied with a series of periodic pulses from an external source (not shown) or it may itself generate the required pulses. The pulse repetition rate should be substantially higher than the frequency of the carrier of the modulated signals used within the analog computer. A reference signal $E_R \sin \omega_c t$ having the same frequency and phase as the carrier of the modulated analog signals is introduced into the pulse-width modulator 15 as the pulse-width modulating signal. The output of the pulse-width modulator is the switching function. As graphically illustrated in FIG. 3a this function comprises a rectangular waveform with a recurrence frequency equal to the high frequency periodic pulses. The pulse-width of this rectangular function varies sinusoidally at the carrier frequency of the reference frequency.

The switching function derived from the pulse-width modulator drives switch 12 to periodically interconnect the modulated input signals alternately with one or the other of the reactive circuit paths comprising natural reactance elements 13 and 14 at the pulse repetition rate, i.e., at a periodic rate substantially higher than the carrier frequency of the modulated input signals. The length of time that the modulated input signals are connected to one of reactive circuit paths deviates from a median value in a manner directly proportional to the instantaneous magnitude of the reference signal $E_R \sin \omega_c t$ while the length of time the modulated input signals are connected to the other of the reactive circuit paths deviates from a median value in a manner directly proportional to the inverse of the instantaneous magnitude of the reference signal $E_R \sin \omega_c t$.

As shown in FIG. 3, the period of a complete switching cycle in which the input signals are connected first to one of the reactive circuit paths and then the other is $\tau$ and the time length the signals are connected to one of the reactive circuit paths is $\delta$ and to the other is $\tau - \delta$. The duty function $\delta/\tau$ varies as a sinusoidal function of the carrier frequency. The switching frequency, $F_s$, then, higher than the carrier frequency, at which frequency the switch is operated, may be expressed as equal to the inverse of $\tau$:

$$F_s = \frac{1}{\tau}$$

The operation of the artificial reactance circuit shown in FIG. 2 is as follows: The sinusoidal current into the artificial capacitor is represented as:

$$i = I_1 f_1(t) \sin \omega_c t \qquad (3)$$

where $\omega_c$ is the reference frequency. Let position 1 of the switching function shown in FIG. 3a correspond to a connection of the switch to capacitor 13 ($C_1$). Then the current flowing into $C_1$, averaged over the period $\tau$ is defined by the equation $$i_1 = \frac{\delta}{\tau} I_1 f_1(t) \sin \omega_c t \qquad (4)$$

As previously noted, the duty ratio ($\delta/\tau$) is varied as a sinusoidal function of the carrier frequency. In a preferred embodiment of the pulse-width modulator 15 the duty cycle varies in accordance with the following equation:

$$\frac{2\delta}{\tau} = 1 + KE_R \sin \omega_c t \qquad (5)$$

where $KE_R$ is less than unity and represents the degree of modulation as determined by the design of the pulse-width modulator and the amplitude of the reference voltage $E_R \sin \omega_c t$. If Equation 5 is substituted in Equation 4, $i_1$ may be written as:

$$i_1 = \frac{I_1 f_1(t)}{2} \sin \omega_c t + \frac{I_1 f_1(t)}{2} KE_R \sin^2 \omega_c t \qquad (6)$$

Averaged over one cycle of the reference frequency:

$$i_1 \text{ (average)} = \frac{I_1 f_1(t) KE_R}{4} \qquad (7)$$

Thus it is seen that there is a net D.C. current flow into $C_1$. Therefore the voltage $V_1$ across $C_1$ changes such that:

$$\frac{dV_{c1}}{dt} = \frac{i_1 \text{ (average)}}{C} = \frac{I_1 f_1(t) KE_R}{4C_1} \qquad (8)$$

The current flowing into $C_2$, averaged over the period $\tau$ is defined by the equation:

$$i_2 = \frac{T - \delta}{\tau} I_1 f_1(t) \sin \omega_c t \qquad (9)$$

Going through the same derivation for Equation 9 as for Equation 4 discloses that the voltage $V_2$ across $C_2$ changes such that $$\frac{dV_{c2}}{dt} = -\frac{I_1 f_1(t) KE_R}{4C_2} \qquad (10)$$

Since the capacitors $C_1$ and $C_2$ are of equal capacitance, it is seen from Equations 8 and 10 that they acquire equal and opposite voltages proportional to the integral of the input sinusoidal current amplitude.

The voltage across the modulated capacitor will alternate at the switching rate between the equal and opposite voltages on $C_1$ and $C_2$. With $V_c$ representing the value of the capacitance voltage, the voltage output $E_{\text{out}}$ from the artificial capacitor can be illustrated as in FIG. 3b. The net voltage averaged over the period $\tau$ may be calculated from the formula:

$$\text{Average value of any periodically occurring wave form} = \frac{1}{\tau}\int_0^\tau y(t)dt \quad (11)$$

Figure 3A:
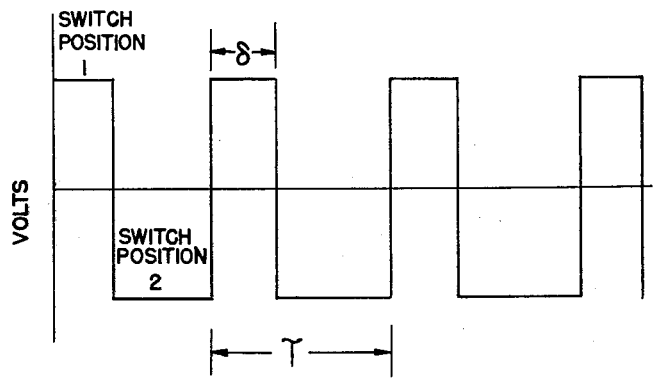
FIGS. 3a and 3b illustrate respectively the switching function and voltage output of the artificial capacitor circuit of FIG. 2.
Figure 3B:
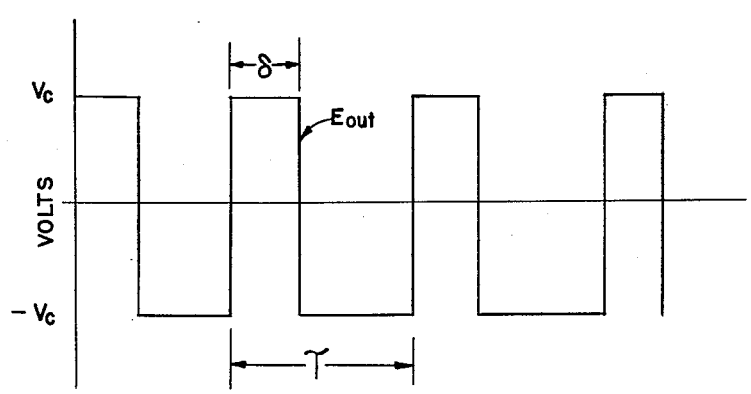

For the wave form illustrated in FIG. 3b:

$$y(t)=V_c \quad 0<t<\delta$$
$$y(t)=-V_c \quad \delta<t<\tau$$

Therefore, the net voltage averaged over the period $\tau$ is:

$$E_{out}=\frac{1}{\tau}\int_0^\delta V_c dt + \frac{1}{\tau}\int_\delta^\tau V_c dt$$

$$=\frac{1}{\tau}[V_c\delta - V_c(\tau-\delta)]$$

$$=V_c\left[\frac{2\delta}{\tau}-1\right] \quad (12)$$

Substituting Equation 5 in Equation 12 permits writing $$E_{out}=E_0 \sin \omega_c t \quad (13)$$

where $E_0=V_c K E_R$. If the expression of Equation 8 is integrated with respect to time:

$$V_c = \frac{E_R K}{4C}\int I_1 f_1(t)dt \quad (14)$$

If Equation 14 is substituted in Equation 13 the voltage $E_0$ in Equation 12 may be written as $$E_0=\frac{K^2 E_R^2}{4C}\int I_1 f_1(t)dt \quad (15)$$

or, substituting Equation 14 into Equation 12 gives:

$$e_{out}=\left[\frac{K^2 E_R^2}{4C}\int I_1 f_1(t)dt\right]\sin \omega_c t \quad (16)$$

Since K, C and $E_R$ may be held constant, it will be seen that the circuit of FIG. 2 has achieved the desired output hereinbefore described and defined in Equation 2. Thus, the modulation of the electrical switch connection to the capacitor causes it to operate with respect to the modulation envelope of the modulated carrier frequency in the same manner as a natural, or an ordinary, capacitive circuit of value $$\frac{4C}{K^2 E_R^2}$$

will operate with respect to a current of the frequency of the modulating or envelope frequency.

In the foregoing analysis, the switching noise has been neglected. As distinguished from the present state of the art the filtering of this noise presents no undesirable carrier phase shift or other adverse effects. The complete analysis of the output voltage from the artificial capacitor is:

$$e=E_0 \sin \omega_c t + \text{high frequency noise} \quad (17)$$

The high frequency noise represents the switching frequency and its harmonics, each with side bands associated with the reference frequency and its harmonics. For example, if the reference frequency (and carrier frequency of the modulated input signals) is 400 cycles per second and the recurrence frequency of the switching function is 25 kilocycles per second, the ratio of the lowest frequency component of noise to the frequency of the desired signal, $\omega_c$, is greater than 60 to 1. This reduces considerably the difficulty in designing a filter which attenuates the switching frequencies and transmits the side bands of the amplitude modulated carrier-frequency signal with substantially zero phase shift. A filter comprising passive elements usually permits zero phase shift at only one frequency such as the mid-band frequency. A variation in either the frequency of the carrier or the mid-band frequency of the filter (e.g. due to a change in the passive elements due to temperature variation, etc.) will cause a phase shift in the signal being transmitted through the filter unless otherwise compensated for. In this invention, however, the phase slope may be made relatively small over a range of many cycles per second because of the wide frequency range between the mid-band and high cutoff frequency.

Figure 4:
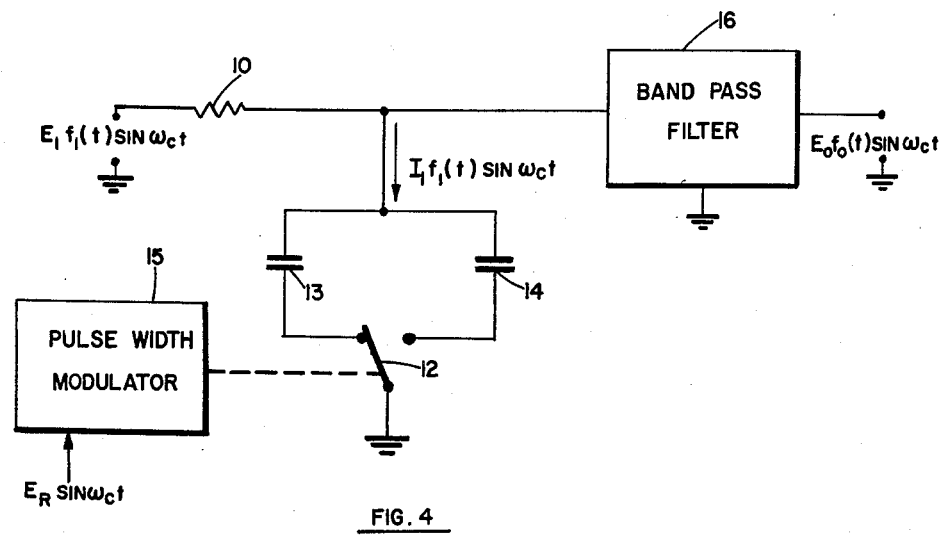

FIG. 4 illustrates an embodiment of this invention in which a band-pass filter network 16 has been added to the output of circuit shown in FIG. 2. This filter is of such design that its mid-band frequency is the carrier frequency thereby transmitting the side bands of the modulated carrier-frequency signal with substantially zero phase shift and attenuating the switching frequency, and its harmonics.

Since the operational characteristics of this invention are a function of the degree of modulation, K, it is apparent that for successful operation the predetermined degree of modulation must be held substantially constant. Thus it is required that the drift and linearity problems arising in the pulse-width modulator stage be minimized. A negative feedback loop may be employed for this purpose, one embodiment of which is shown in FIG. 5. For convenience those elements which may be identical to those shown in FIGS. 2 and 4 bear the same reference numerals. Switch 12, driven by pulse-width modulator 15, alternately makes connection with one or the other of identical capacitors 13 and 14. The circuit shown is a lag circuit of the same general description as shown previously in FIG. 1. Thus the resistance 10 is connected in series between the input and output of the network and the artificial capacitance is connected in parallel. As in FIG. 4, a band-pass filter 16 is connected to the output of the circuit to remove the switching noise. The negative feedback loop comprises a band-pass filter 16a, summation point 21, and amplifier 22. The output of the band-pass filter 16a is added to the reference signal $E_R \sin \omega_c t$ at summation point 21 and amplified in alternating current amplifier 22, the output of which is utilized to vary the duty cycle of the output of the pulse-width modulator 15. The output of band-pass filter 16a is such that the signal is opposite in phase with the input reference carrier frequency signal so as to produce an error signal at the input of amplifier 22. The band-pass filter 16a may be identical to previously described band-pass filter 16 and is designed to transmit the side bands of the modulated carrier frequency signal with substantially zero phase shift and attenuate the high frequencies associated with the recurrence rate of the pulses from the pulse width modulator 15 and the harmonics associated therewith.

The negative feedback loop shown in FIG. 5 monitors the degree of modulation of the pulses from the pulse-width modulator 15 in a well-known manner. A change in the error signal caused by drift or non-linearity in the pulse-width modulator causes a proportional change in amplitude of the carrier frequency signal controlling the degree of modulation K. This change will be of such magnitude and sign so as to vary the pulse-width modulator output to compensate for the drift error. Other than the negative feedback loop, the artificial capacitance shown in FIG. 5 operates in an identical manner to the circuit shown in FIG. 4 and described above.

The circuits previously shown for providing an artificial capacitance unit adapted for use with modulated signals are also adaptable for providing artificial inductance units. One embodiment of this circuit is shown in FIG. 6 wherein a center tapped inductance 25 is connected to a switch 12 driven by pulse-width modulator 15 as in the prior embodiments. As previously shown in FIG. 5 a negative feedback loop comprising band-pass filter 16a, summation point 21 and amplifier 22 may be used for improving the operating characteristics of pulse-width modulator 15. Band-pass filter 16 may be connected as shown to remove the switching noise. Between terminals 26 and 27 is afforded an artificial inductance adapted for use with modulated signals.

The voltage across an inductance is determined by the inductance and the derivative of the current through the inductance; or $$e = L\frac{di}{dt} \qquad (18)$$

It is readily apparent that if the input current is a modulated carrier frequency current the inductance will operate upon the carrier. Following a derivation for the circuit of FIG. 6 similar to that of FIG. 2 the output from the artificial inductance may be shown to be:

$$E_{out} = E_0 \sin \omega_c t \qquad (19)$$

where $$E_0 = V_L K E_R \qquad (20)$$

and $$V_L = \frac{LKE_R}{4} \frac{dI_1 f_1(t)}{dt} \qquad (21)$$

In Equation 21, L represents the inductance of one-half of the center tapped inductor 25.
Thus $$E_0 = \frac{LK^2 E_R^2}{4} \frac{dI_1 f_1(t)}{dt} \qquad (22)$$

Therefore the artificial inductance operates with respect to the modulation envelope of the suppressed carrier signal in the same way as an inductance of value $$\frac{LK^2 E_R^2}{4}$$

would operate with respect to a simple current of modulating frequency.

Figure 7:
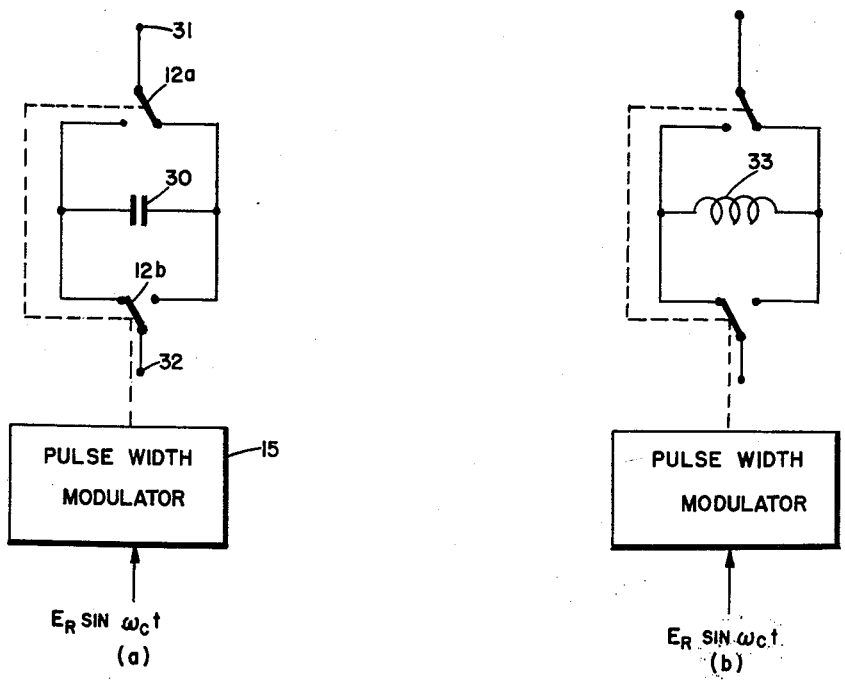

Using the principles herein disclosed, numerous embodiments are afforded for artificial inductance and capacitance networks. Examples of these are shown in FIG. 7 in which first and second reactive current paths are provided by a single natural reactive element. For convenience, the artificial reactance circuits are shown without a feedback loop and output filter. It will of course be readily understood that each of the circuits shown are operable therewith in the manner described above and illustrated in FIGS. 4 and 6.

Thus FIG. 7(a) employs a single capacitor 30 used with a pair of single-pole double-throw switches 12a and 12b which alternately reverse the terminal connections of the capacitor 30 at the switching rate. As in the prior embodiments a pulse-width modulator 15 supplies switching pulses having at a high recurrence rate and their widths modulated at the carrier frequency rate. Between terminals 31 and 32 is provided an artificial capacitor which operates with respect to the modulation envelope of modulated signals.

FIG. 7(b) shows hte inductance equivalent to the circuit shown in FIG. 6(a), the only modification being the substitution of inductance 33 for capacitance 30.

In FIG. 8 is shown the artificial capacitance previously described and illustrated in FIG. 2, in an integrator circuit. As shown a high gain amplifier 40 has a capacitance feedback circuit connected between its input and output comprising switch 12 and capacitors 13 and 14. The circuit operates on the modulation envelope of input modulated signals thus affording a direct integration without the necessity of demodulating the input signals. In similar manner an integrator may be provided by using any of the other embodiments of the artificial capacitor hereinbefore described.

A differentiator circuit may be provided by substituting the artificial inductance circuits described above for the artificial capacitance circuit in the circuit shown in FIG. 8. As in each of the embodiments of this invention, the circuit will operate on the modulation envelope of input modulated signals.

An analog computer normally consists of a plurality of networks, examples of which are lag networks, lead networks, differentiators and integrators. As previously noted, my invention provides unique circuitry for achieving such networks which will operate directly upon the modulation envelope of carrier modulated analog signals.

In the foregoing descriptive material each of the circuits has been considered to operate in combination with an associated pulse-width modulator and source of reference carrier signal. In a computer comprising a plurality of such circuits, the provision of a plurality of pulse-width modulators would considerably increase the complexity and expense of the computer. An important advantage of my invention is that a single pulse-width modulator stage may supply the modulated pulses to a plurality of the networks. An example of an analog computer is shown in FIG. 9. This computer includes an integrator circuit 41, a differentiator circuit 42, a lag circuit 43 and a lead circuit 44. Connected to each of these circuits at their input terminals are respective suppressed carrier modulated signals denoted as $E_1 f_1(t) \sin \omega_c t$, $E_2 f_2(t) \sin \omega_c t$, $E_3 f_3(t) \sin \omega_c t$, and $E_4 f_4(t) \sin \omega_c t$. A single pulse-width modulator 15 with its associated feedback loop drives a plurality of switches each of which is individual to one of the analog computer networks. Each of the networks in FIG. 9 operate in the manner of the circuits previously described and operate upon the modulation envelope of the respective input signals.

FIG. 10 illustrates schematically circuitry which may be utilized to construct the artificial reactance circuits of my invention. The particular circuit shown provides the artificial capacitance previously shown in FIG. 5 as part of a lag network. The pulse-width modulator and associated feedback loop includes summation network 21 comprising resistors 71 and 72. Connected to resistor 72 is the reference carrier frequency signal $E_R \omega_c t$. Connected to resistor 71 is the feedback carrier frequency signal from the band-pass filter 16a. The output of summation network 21 is coupled to the grid of triode 73 which provides one stage of amplifier 22. The output of the plate of triode 90, the other stage of amplifier 22, is coupled to a phase-splitter circuit including triode 150. The voltage drop across the cathode connected resistor 155 is in phase with the input to triode 150. Contrariwise, the voltage between plate 151 of triode 150 and ground is inversely proportional to the input signal to triode 150. This is caused by the voltage drop between plate 151 and the B+ supply due to current flow in resistor 152 when triode 150 conducts. Signals 153 and 154 are the two outputs of the phase-splitter and are therefore 180° out of phase with each other.

The signals 153 and 154 are fed to the grids of triodes 160 and 161. Triodes 160 and 161 are connected as a free running multivibrator functioning as pulse-width modulator 15. Variable capacitors 162 and 163 connecting the grid of each triode with the plate of the other are adjusted so that the multivibrator oscillates at the desired pulse repetition frequency. Capacitors 162 and 163 also adjust the median duty cycle. It is preferable to set the median duty cycle to 50% since an operating zero reference level at more or less than the 50% duty cycle does not permit a maximum swing in the positive or negative going cycles of the carrier frequency. The output of the pulse-width modulator would therefore have to be of limited amplitude in order to avoid clipping which would cause undesirable distortion in the carrier-frequency wave form.

The variable duty cycle output of pulse-width modulator 15 is obtained by varying the cutoff and conducting periods of the two triode stages. For example, for carrier-frequency inputs 153 and 154, triode 160 will tend to conduct sooner than it would without a positive going carrier-frequency signal on its grid while simultaneously triode 161 will tend to cut off sooner due to the negative going half cycle of the carrier frequency on its grid. The conducting and cutoff time of triodes 160 and 161 will vary, therefore, sinusoidally according to the frequency of the carrier signal. The desired pulse-width modulator output at junction point 164 will therefore be a series of pulse-width modulated pulses.

Capacitor 165 couples the output from point 164 of the multivibrator stage with the succeeding stage and removes the direct current information carried by the multivibrator output. The average value of output signal 167 therefore is always zero. Diodes 168 and 169 are connected so as to clip the amplitudes of both positive and negative polarity pulses of signal 167. A signal 170 is formed thereby having positive and negative pulses of equal magnitude. This is the desired output signal from the pulse-width modulator and was previously shown in FIG. 3a.

Signal 170 is taken from across the cathode resistor 135 of the cathode follower stage 50 and functions as the switch function shown in FIG. 3a. Stage 50 provides a low impedance input to switch 12. Switch 12 is a vacuum tube embodiment of the type of switch illustrated in FIG. 2. It comprises two pair of triodes 52, 53 and 54, 55, each having their grids connected to secondaries of transformer 56. Capacitors 13 and 14 are connected in series between the plate of triode 52 (and cathode of triode 54) and the cathode of triode 53 (and the plate of triode 55). The outputs of the capacitor are at 31, the midpoint connection of the capacitors 13 and 14, and 32, the common connection of the respective plates of triodes 53 and 54 and cathodes of triodes 52 and 55. Signal 170 is introduced into the primary of transformer 56 from the output of cathode follower 50. As denoted by the dot convention, during the positive polarity pulses of signal 170, triodes 52 and 54 will be biased so as to conduct while triodes 53 and 55 are cut off. During the period that triodes 52 and 54 are conducting, the capacitor 13 will be connected in circuit with the output terminals 31 and 32. Triodes 52 and 54 combine to form a closed path for both positive and negative signals. During negative polarity pulses of signal 170, triodes 52 and 54 are cut off while triodes 53 and 55 are biased so as to conduct. A low impedance path therefore connects the capacitor 14 between the output terminals 31 and 32. It will be observed that the switching triodes 52, 53, 54 and 55 have functioned in a manner similar to that of the mechanical switch illustrated in FIG. 3a.

Connected to the output of pulse-width modulator 15 is a band-pass filter 16a. This filter comprises resistance elements 58, 59, 60, inductance elements 61 and capacitance elements 62, 63, and 64. The output of filter 16a comprises the feedback carrier-frequency signal.

FIG. 11 illustrates the attenuation characteristics of filter 16a of FIG. 10, designed in this case for use with a carrier frequency of 400 c.p.s. and a switching frequency of 25,000 c.p.s. It will be noted that a very high attenuation is provided for the frequencies and side bands connected with the switching noise.

Filter circuits 16 are also preferably designed so as to have zero phase shift at the mid-band frequency. Although a filter made up of passive elements will have some phase variation as the frequency changes from the mid-band frequency, it has been found that a filter of this type is satisfactory when combined with negative feedback in the closed loop pulse width modulator circuit. For applications demanding even higher accuracy, band-pass filters including active elements would provide a substantially zero phase change over a range of many cycles.

An important consideration in building circuitry such as shown in FIG. 10 is to insure against stray capacitance within the switch 12. Of primary consideration is that the transformer 56 have low interwinding capacitance. A lesser problem is the interelectrode capacitances of the switching triodes 52, 53, 54 and 55, and the interwiring capacitance of the circuit. If such stray capacitances are not prevented, the performance of the circuit will be seriously degraded since the switch 12 will never provide an open circuit. The effect of this will appear as an undesired shunting resistance connected across the artificial capacitance or inductance.

Another important consideration is to insure that the switch have as short a "dead time" as possible. The dead time is that time when both sides of the switch are open or closed simultaneously. For capacitive circuits, the dead time must be "open" (referred to in the switching art as "break-before-make"); in an inductive circuit, the dead time must be "closed" (make-before-break).

The circuitry of FIG. 10 could, of course, be utilized to duplicate the embodiments of the invention illustrated in the other figures. In the circuit of FIG. 2, the circuitry comprising summation point 21, amplifier 22 and band-pass filter 16a are unnecessary. For the embodiment shown in FIG. 9 wherein a single pulse-width modulator stage is used to supply switching pulses to a plurality of analog computer networks, additional secondary windings for transformer 56 would be necessary, or in the alternative additional transformers such as 56 would have their primary windings connected to the output of the cathode follower stage 50.

As previously noted, the artificial reactances constructed by my invention operate with respect to the modulation envelope of the modulated carrier-frequency signal in the same manner as a natural capacitor of value $$\frac{4C}{K^2 E_R^2}$$

will operate with respect to an unmodulated current, such as a current of the frequency of the amplitude modulating envelope, which is, of course, considerably lower in frequency than the carrier frequency. A significant corollary is that the reactance of the artificial reactance element may be varied not only by varying the reactance of the natural reactance elements such as capacitors 13 and 14 but also by altering the degree of modulation K. Thus the effective capacitance of the circuit may be modified while the circuit is in operation by changing the amplitude of the reference voltage $E_R \sin \omega_c t$. A circuit illustrating this embodiment of the invention is shown in FIG. 12. The circuit is quite similar to those hereinbefore shown with the addition of a voltage divider 175 for varying the magnitude of the reference voltage, $E_R \sin \omega_c t$, which modulates the width of the pulses in the pulse-width modulator 15. As the movable contact of divider 175 is moved, the value of the artificial capacitance acting on the modulation envelope of the input signals varies. Thus a capacitance or inductance which varies electrically is easily constructed.

Although the invention has been described and illustrated in detail, it is to be clearly understood that the same is by way of illustration and example only and is not to be taken by way of limitation, the spirit and scope of this invention being limited only by the terms of the appended claims.

I claim:

1. An artificial reactance element for use with modulated input signals comprising a natural reactance element, and means for periodically interconnecting said modulated input signals with said natural reactance element for lengths of time varying in accordance with the amplitude of a carrier signal component of said modulated input signals and at a periodic rate substantially higher than the carrier frequency of said carrier frequency signal, whereby only the modulation envelope of said modulated input signal is acted upon by said natural reactance element.

2. The artificial reactance element defined in claim 1 wherein said natural reactance element is a capacitor.

3. The artificial reactance element defined in claim 1 wherein said natural reactance element is an inductor.

4. The artificial reactance element defined in claim 1 having a means coupled thereto for transmitting the side bands associated with the carrier frequency of said modulated input signals and attenuating the periodic rate frequencies and its harmonics.

5. An artificial reactance element for use with modulated input signals comprising a natural reactance element, switch means periodically interconnecting said modulated input signals with said natural reactance element at a substantially higher rate than the carrier frequency of said modulated input signals, and means for causing the duty cycle of said switch means to vary according to the amplitude of the carrier component of said modulated input signals.

6. An artificial reactance element for use with modulated input signals comprising means for supplying a pulsed signal having a repetition rate substantially higher than the carrier frequency of said modulated input signals, means for varying the duty cycle of said pulsed signal in accordance with the amplitude of the carrier frequency of said modulated input signals, a natural reactance element, and switching means connected to said pulsed signal of variable duty cycle for periodically interconnecting said natural reactance element with said modulated input signals.

7. An artificial reactance element for use with modulated input signals comprising first and second natural reactive elements, and means for alternately providing a low impedance path for said modulated input signals through said first natural reactive element and through said second natural reactive element at a periodic rate substantially higher than the carrier frequency of said modulated input signals and for periods varying in accordance with the amplitude of the carrier component of said modulated input signals.

8. An artificial reactance element for use with modulated input signals comprising first and second two terminal natural reactive elements of substantially equal reactance, a first output terminal connected to one of the terminals of each of said natural reactive elements, a second output terminal, a switch connected to said second output terminal and alternatively connecting said second output terminal to the other terminal of said first natural reactive element or to the other terminal of said second natural reactive element, a pulse-width modulator for generating a switching function having a repetition rate substantially higher than the carrier frequency of said modulated input signals and a duty cycle which varies in accordance with the amplitude of the carrier component of said modulated input signals, and means for coupling said pulse-width modulator to said switch so that said switching function drives said switch.

9. An artificial reactance element for use with modulated input signals comprising a natural reactance element, switch means for periodically interconnecting said modulated input signals with said natural reactance element at a substantially higher rate than the carrier frequency of said modulated input signals, pulse-width modulator means coupled to said switch means for causing the duty cycle of said switch means to vary in accordance with the amplitude of the input to said pulse-width modulator, a filter means coupled to said pulse-width modulator means for transmitting the side bands associated with the carrier frequency of said modulated input signals and attenuating the frequencies of said periodic transmission path and its harmonics, the output of said filter means comprising a feedback signal, a source of reference carrier frequency signal, means for adding said feedback and said reference carrier signal thereby producing an error signal, and means coupling said error signal to said input of said pulse-width modulator means.

10. An artificial reactance element for use with modulated input signals comprising a natural reactance element, first means for periodically interconnecting said modulated input signals with said natural reactance element, second means having its output coupled to said first means for driving said first means at a periodic rate substantially higher than the frequency of an input error signal and for varying the periods in which said modulated input signals are connected with said natural reactance element according to said input error signal, and a reference signal having the same frequency as the carrier of said modulated input signals, said input error signal comprising the sum of the output of said second means and said reference signal.

11. An artificial reactance element for use with modulated input signals comprising first and second output terminals, a natural reactive element having two terminals, a first switch means for alternatively connecting said first output terminal to one or the other of said terminals of said natural reactive element, a second switch means for alternatively connecting said second output terminal to one or the other of said terminals of said natural reactive element, a reference signal having the same frequency as the carrier of said modulated input signals, a pulse-width modulator coupled to said reference signal having an output switching function comprising a series of pulses at a repetition rate higher than said reference signal and whose pulse-width varies according to the amplitude of said reference signal, and means for coupling said switching function to said first and second switch means so that said first and second output terminals are always connected to opposite terminals of said natural reactive element.

12. A plurality of artificial reactance elements for use with respective modulated input signals each having the same carrier frequency comprising a plurality of natural reactance elements, a plurality of first means respectively associated with said natural reactance elements for interconnecting the associated natural reactance element with respective modulated input signals in response to a second means coupled thereto, said second means driving each of said first means at a repetition rate substantially higher than said carrier frequency and for periods varying in accordance with the amplitude of the carrier of said input signals.

13. An artificial reactance element of variable reactance for use with modulated input signals comprising a natural reactance element, a source of reference signal of variable amplitude and having the same frequency as the carrier of said modulated input signals, means connected to said source of reference signal for periodically interconnecting said modulated input signals with said natural reactance element at a repetition rate substantially higher than the frequency of said reference signal and for periods varying in accordance with the frequency of said reference signal, whereby the modulation envelope of said modulated input signal is acted upon by a reactance which varies according to the amplitude of said reference signal.

14. An artificial reactance element for use with modulated input signals comprising a natural reactance element, a switch coupled to interconnect said modulated input signals with said natural reactance element in response to an input switching function, a pulse-width modulator coupled to said switch for generating said switching function, said switching function comprising pulses whose width varies sinusoidally at the frequency of the carrier of said modulated input signals and having a repetition rate which is substantially higher than said carrier, and a band-pass filter coupled to said natural reactance element designed to attenuate the repetition frequencies and associated harmonics of said switching function and the mid-band frequency at said carrier frequency.

15. An electronic circuit comprising circuit means adapted to receive modulated carrier signal, reactance means, means for connecting and disconnecting said reactance means in said circuit means, means for varying the length of time said reactance means is connected in said circuit, said varying being in accordance with the amplitude of the carrier of said modulated carrier signal.

16. An electronic circuit comprising circuit means adapted to receive a modulated carrier signal, a first reactance circuit path, a second similarly reactive circuit path, means for connecting said reactive circuit paths in said circuit means alternately and at a substantially higher frequency than the carrier frequency of said modulated carrier signal, means for varying the lengths of time said reactive circuit paths are connected in said circuit, said varying being in accordance with the amplitude of the carrier of said modulated carrier signal.

17. The combination recited in claim 16 wherein the length of time one of said reactive circuit paths is connected in said circuit is proportional to the instantaneous magnitude of the carrier modulated signal and the other reactance circuit path is connected in said circuit is proportional to the inverse of the instantaneous magnitude of the carrier modulated signal.

References Cited in the file of this patent
UNITED STATES PATENTS

| | | |
|---|---|---|
| 2,584,954 | Williams | Feb. 5, 1952 |
| 2,708,257 | Bedford | May 10, 1955 |
| 2,822,978 | Donovan | Feb. 11, 1958 |
| 2,965,823 | Wolman | Dec. 20, 1960 |

UNITED STATES PATENT OFFICE
CERTIFICATE OF CORRECTION

Patent No. 3,072,854                        January 8, 1963

Robert O. Case, Jr.

It is hereby certified that error appears in the above numbered patent requiring correction and that the said Letters Patent should read as corrected below.

Column 1, line 36, for "January 6, 1938" read -- January 6, 1958 --; column 2, line 58, for "FG. 4" read -- FIG. 4 --; column 4, lines 47 to 49, equation (7) should appear as shown below instead of as in the patent:

$$i \text{ (average)} = \frac{I_1 f_1(t) K E_R}{4}$$

column 7, line 52, for "hte" read -- the --.

Signed and sealed this 3rd day of March 1964.

(SEAL)
Attest:
ERNEST W. SWIDER
Attesting Officer

EDWIN L. REYNOLDS
Acting Commissioner of Patents